UNITED STATES PATENT OFFICE.

HENRY ADOLPHUS DANIELS, OF YONKERS, NEW YORK.

MANUFACTURE OF ARTIFICIAL STONE AND MARBLE.

SPECIFICATION forming part of Letters Patent No. 297,971, dated May 6, 1884.

Application filed March 1, 1884. (Specimens.)

*To all whom it may concern:*

Be it known that I, HENRY ADOLPHUS DANIELS, of the city of Yonkers, county of Westchester, and State of New York, have invented an Improvement in the Manufacture of Artificial Stone and Marble; and I hereby declare the following to be a full, clear and exact description thereof.

My invention relates to the production of beautiful imitations of different varieties of marble, and also artificial stone, which shall possess great strength, hardness, and durability; and my invention consists in a composition formed of certain ingredients combined and chemically treated in such a manner as to produce a hard crystallized substance which is capable of successfully resisting the action of water, frost, and heat, and is therefore particularly adapted for use as a building material in any climate, and for an infinite variety of other purposes, as will be hereinafter set forth.

I first mix together in a suitable vessel twenty pounds of starch dissolved in thirty gallons of water, ten pounds of gum-arabic dissolved in five gallons of water, three pounds of caoutchouc dissolved in ether or otherwise, one gallon of white vitriol, twenty pounds of pearlash dissolved in twenty gallons of water, four pounds of glue in ten gallons of water, one quart of muriate of soda, and three gallons of soluble glass; if for colored marble, I add twelve ounces of nut-gall to set the colors. These mixtures having been thoroughly dissolved, I mix and thoroughly unite them all together in one vessel.

For marble I take one quart of the above solution and add one gallon of water to the same. I then take equal parts (more or less) of Keen's or Martin's cement, calcined or other plaster, marble dust or pure white sand, and thoroughly and intimately mix or combine these materials with one another in a perfectly dry state, after which I add and thoroughly stir in a sufficient quantity of the last-mentioned diluted mixture of solution until the mass has the consistency of dough, which is then placed in suitable molds (to give it any desired shape) and compressed, after which it is allowed to dry. After being removed, it can be polished in the same manner as ordinary marble. Should I desire to place veins or dots of different colors in the marble, I take the marble when first mixed and roll it out with a rolling-pin to about the thickness of pie-crust, then mix a different color, roll it out, and lay each color one on top of the other, making as many colors as desired. I then roll them all together, making a large ball, then cut off in slices, laying them on a smooth surface, and tamp them down, which will give me any color I desire, the veins running through the entire marble.

For walls I place the material, while in a plastic state, on the walls; and if I wish to color the same I have a round stick covered with flannel, and when the material is placed on the walls and commences setting I dip the flannel in any desired color and roll the same upon the walls, which color or colors will unite the same, giving it the appearance of marble. I then trowel the same, intermingling the different colors. Polish when dry.

For artificial stone I take pure sharp sand or gravel, cement-lime, or lime of Tiel, and mix them in a dry state. The quantity of cement-lime or lime of Tiel will vary in the amount used according to the work desired. For instance, for sidewalks, the bottom would be about one part of cement to six or seven parts of sharp gravel, while the top should be two parts of cement to four parts of fine sifted sharp sand, and about the same proportions in building material. Cemetery work should be stronger of cement to make a handsome and firm job, while for cellar-bottoms, foundations for buildings, silo-walls, &c., it would not require so much, as the stone or gravel is much larger than that used for cemetery or other fine work. However, every particle of sand and gravel should be covered with the solution and cement-lime or lime of Tiel. The solution should be diluted by using one gallon of the solution to four gallons of water. The sand and gravel should be dry and placed in a mixing-box and dampened with the solution, and the cement-lime or lime of Tiel sifted over the same, as the cement will adhere to the gravel and sand, and each particle will be more thoroughly mixed and more evenly than to mix the cement and sand dry. When the above is thoroughly mixed and dampened, it can be tamped into any desired molds or made in a plastic state, and by adding mineral colors can be made to imitate any natural stone.

The chemical solution above described produces a perfect crystallization of the compound, which is thus solidified and rendered hard, durable, and capable of withstanding an immense pressure, the particles being thereby caused to adhere so closely and tenaciously together as to render the material insoluble and impervious to air and water, and capable of resisting the action of fire, frost, acids, and other disintegrating influences.

Artificial stone and marble made as above described can be used to great advantage for building-blocks, and also for an infinite variety of other purposes—such as the exterior and interior decorations of buildings, mantel-pieces, cemetery work, monuments, flooring, sidewalks, belting-courses, trimmings, &c.—it being easily and cheaply molded into any desired shapes, whereby the great expense which is incurred in cutting natural marble and stone into the artistic and elaborate designs so frequently employed is entirely avoided, thus rendering it possible to erect buildings embellished with beautiful architectural designs at a much less cost than where natural marble or stone is employed.

What I claim as my invention, and desire to secure by Letters Patent, is—

1. An artificial stone or marble composed of lime of Tiel, lime, Keen's cement, Martin's or other cements, marble-dust, and calcined or other plaster, united and solidified by mixing therewith a chemical solution formed of starch, gum-arabic, caoutchouc, white vitriol, glue, muriate of soda, soluble glass, and pearlash, with or without nut-gall, substantially as and for the purposes set forth.

2. The herein-described liquid compound, consisting of starch, gum-arabic, caoutchouc, white vitriol, glue, muriate of soda, soluble glass, and pearlash, with or without nut-gall, substantially in the proportions named, for the purpose of producing the crystallization of the artificial stone and marble, as described.

Witness my hand and seal this the 11th day of February, A. D. 1884.

HENRY ADOLPHUS DANIELS. [L. S.]

Witnesses:
WILLIAM ROBERTS,
HERBERT H. TRAVIS.